(12) United States Patent
Warr et al.

(10) Patent No.: US 12,194,807 B2
(45) Date of Patent: Jan. 14, 2025

(54) ONE-WAY INSTALLATION FOR A BUSHING OF AN AUTOMOTIVE SUSPENSION LINK

(71) Applicant: FORD GLOBAL TECHNOLOGIES, LLC, Dearborn, MI (US)

(72) Inventors: Grant Warr, Bloomfield Hills, MI (US); Peter Joseph Jargowsky, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 86 days.

(21) Appl. No.: 18/138,273

(22) Filed: Apr. 24, 2023

(65) Prior Publication Data
US 2024/0351388 A1    Oct. 24, 2024

(51) Int. Cl.
B60G 7/00 (2006.01)

(52) U.S. Cl.
CPC ........ B60G 7/008 (2013.01); *B60G 2204/148* (2013.01); *B60G 2204/4103* (2013.01); *B60G 2206/017* (2013.01)

(58) Field of Classification Search
CPC .............. B60G 7/008; B60G 2204/148; B60G 2204/4103; B60G 2206/017
See application file for complete search history.

(56) References Cited

U.S. PATENT DOCUMENTS

| | | | | |
|---|---|---|---|---|
| 4,921,271 A | * | 5/1990 | Berry | B62D 17/00 280/86.756 |
| 5,044,659 A | * | 9/1991 | Specktor | B62D 17/00 280/86.753 |
| 5,129,669 A | * | 7/1992 | Specktor | B60G 11/28 280/86.753 |
| 5,163,699 A | * | 11/1992 | Specktor | B62D 17/00 280/86.753 |
| 9,011,060 B2 | * | 4/2015 | Hyatt | F16B 39/282 411/136 |
| D783,393 S | * | 4/2017 | Weifenbach | D8/399 |
| 10,450,005 B2 | * | 10/2019 | Weifenbach | B62D 17/00 |
| 2004/0201193 A1 | | 10/2004 | Arson et al. | |

FOREIGN PATENT DOCUMENTS

| | | |
|---|---|---|
| CN | 107757706 A | 3/2018 |
| CN | 208376462 U | 1/2019 |
| CN | 111332363 A | 6/2020 |
| KR | 20100052799 A | 5/2010 |
| KR | 20100089591 A | 8/2010 |
| KR | 20130044729 A | 5/2013 |
| WO | 2016144330 A1 | 9/2016 |

* cited by examiner

*Primary Examiner* — Paul N Dickson
*Assistant Examiner* — Tiffany L Webb
(74) *Attorney, Agent, or Firm* — Burr & Forman LLP; Lorne Forsythe

(57) ABSTRACT

A vehicle suspension link may include a bushing, a knuckle, a link arm operably coupled to the knuckle via the bushing at a ring formed at one end of the link arm, and a coupling assembly disposed between the knuckle and the bushing. The coupling assembly may include a serrated face and a one-way install feature extending out of a plane of the serrated face to permit orientation of the bushing in the ring such that the serrated face is oriented toward the knuckle, and prevent orientation of the serrated face away from the knuckle.

20 Claims, 5 Drawing Sheets

ONE-WAY INSTALLATION FOR A BUSHING OF AN AUTOMOTIVE SUSPENSION LINK

TECHNICAL FIELD

Example embodiments generally relate to vehicle suspension and, more particularly, relate to a suspension system that employs a one-way install feature for a bushing of a suspension link.

BACKGROUND

Vehicles commonly employ different types of suspension based on planned usage and performance goals. Accordingly, given that certain vehicle types made by different manufacturers compete with each other in the marketplace, trends can develop whereby certain vehicle types tend to coalesce around using the same types of suspension.

That being said, manufacturers may explore market differentiation avenues by employing a different suspension (or different other features) from time to time. Meanwhile, reducing part count and complexity without sacrificing performance often remains a motivating influence on suspension designs. In the presence of these motivations, some suspension designs have recently included suspension links that are symmetrical with identical rings joined to a rod at opposite ends thereof. However, since the link is symmetrical, an installer may have up to four possible ways to install the bushing with its corresponding washers/ferrules. Thus, it may be desirable to provide design features that ensure proper orientation queues to the assembler.

BRIEF SUMMARY OF SOME EXAMPLES

In accordance with an example embodiment, a vehicle suspension link may be provided. The vehicle suspension link may include a bushing, a knuckle, a link arm operably coupled to the knuckle via the bushing at a ring formed at one end of the link arm, and a coupling assembly disposed between the knuckle and the bushing. The coupling assembly may include a serrated face and a one-way install feature extending out of a plane of the serrated face to permit orientation of the bushing in the ring such that the serrated face is oriented toward the knuckle, and prevent orientation of the serrated face away from the knuckle.

In another example embodiment, a vehicle suspension system may be provided. The system may include a frame including one or more lateral or longitudinal frame members, one or more knuckles operably coupled to the frame, and one or more instances of a vehicle suspension link operably coupling one of the one or more knuckles to the frame. The vehicle suspension link may include a bushing, a knuckle, a link arm operably coupled to the knuckle via the bushing at a ring formed at one end of the link arm, and a coupling assembly disposed between the knuckle and the bushing. The coupling assembly may include a serrated face and a one-way install feature extending out of a plane of the serrated face to permit orientation of the bushing in the ring such that the serrated face is oriented toward the knuckle, and prevent orientation of the serrated face away from the knuckle.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
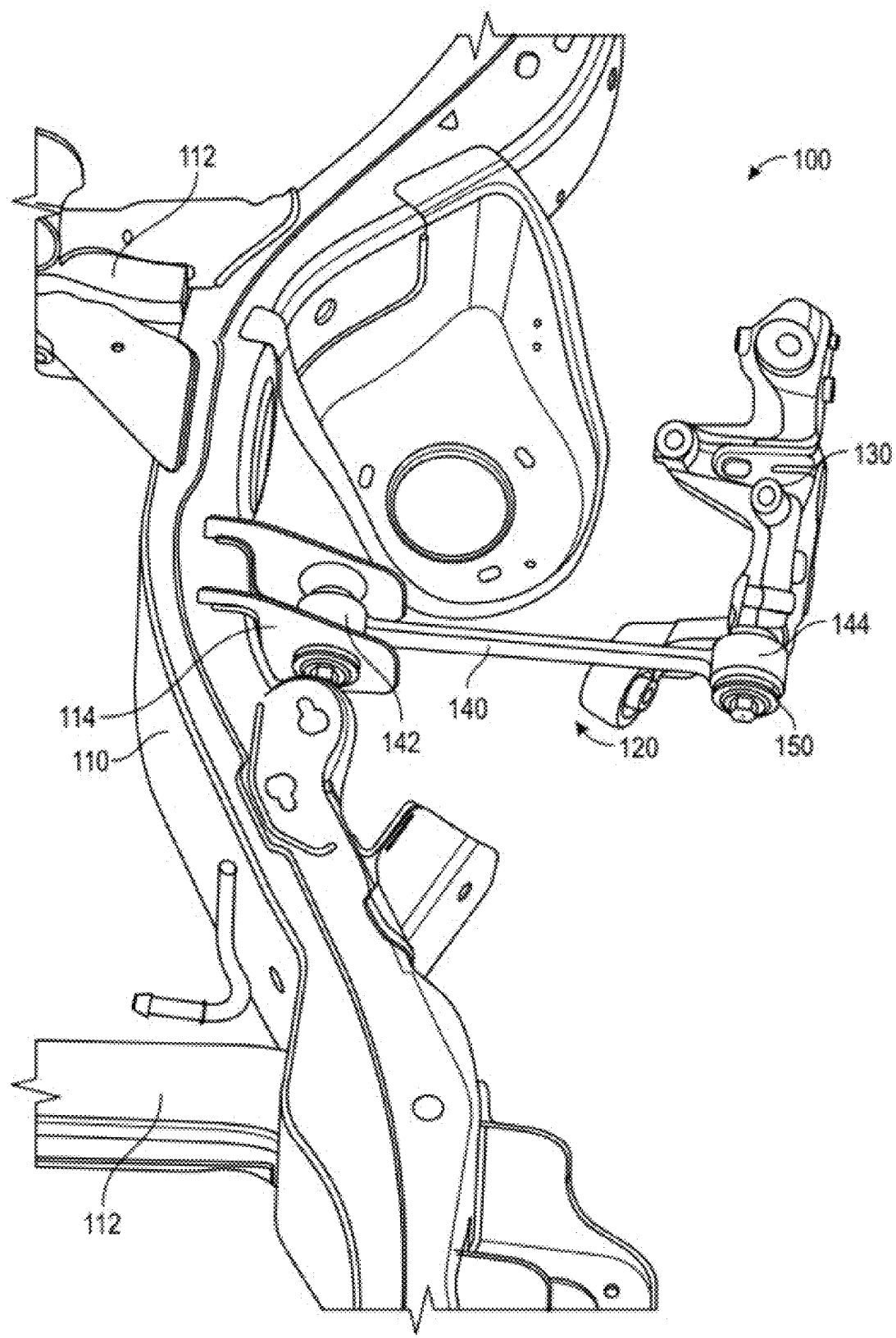
FIG. 1 illustrates a block diagram of a perspective view of certain components of a suspension system of a vehicle in isolation in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As noted above, a symmetrical link may, while increasing simplicity with respect to part design and manufacture, decrease the simplicity of assembly since there may be ambiguity as to how to assemble the part with respect to washers that are to be employed for such assembly. This can be noteworthy when the washers are structured in a way that is intended to provide advantage when oriented in a particular way, as will be discussed in greater detail below. First, however, it is important to appreciate the context in which example embodiments may operate.

FIG. 1 is a perspective view (with may components stripped away to provide visibility) of a portion of a suspension system 100 of a vehicle in accordance with an example embodiment. The suspension system 100 may include a longitudinally extending frame member 110 on one side of the vehicle, and a corresponding symmetrically formed additional longitudinally extending frame member (not shown) on the opposite side of a longitudinal centerline of the vehicle. One or more transverse frame members 112 may extend between the longitudinally extending frame members to define at least a portion of a frame of the vehicle.

A suspension link 120 in accordance with an example embodiment may be provided between the longitudinally extending frame member 110 and a knuckle 130 (for either front or rear wheels). More particularly, a clevis joint may be formed between the suspension link 120 and the longitudinally extending frame member 110 (via clevis 114) at one end of the suspension link 120, and a cantilevered joint may be formed between the suspension link 120 and the knuckle 130 at the other end of the suspension link 120.

Figure 2:
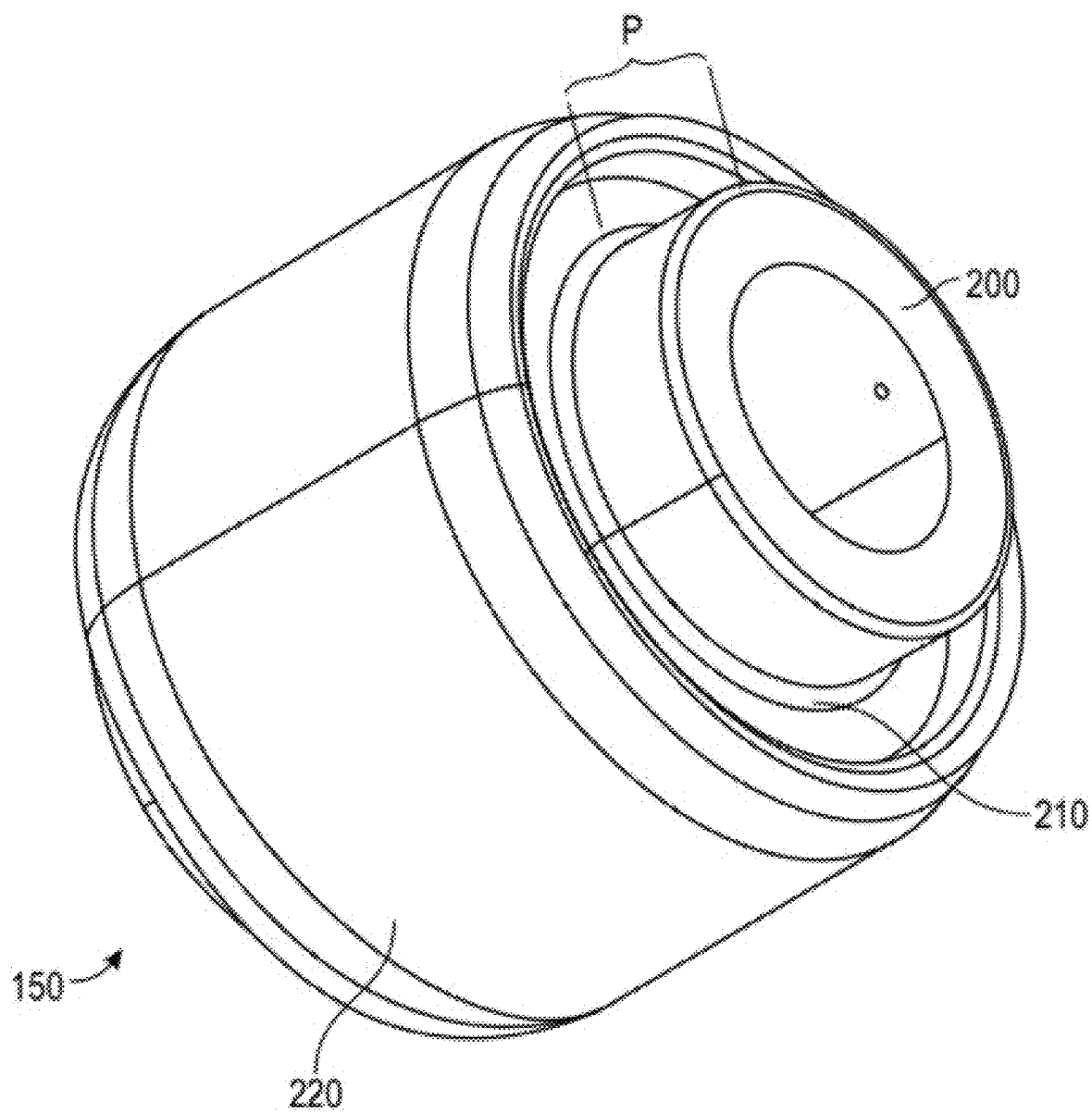
FIG. 2 illustrates a perspective view of a bushing in accordance with an example embodiment.

The suspension link 120 may be formed from a rod 140 having a first ring 142 at a first end of the rod 140, and a second ring 144 at a second end of the rod 140. Both the first and second rings 142 and 144 may be operably coupled to the longitudinally extending frame member 110 and the knuckle 130, respectively, via a bushing 150. On the side of the rod 140 with the first ring 142, a fastener assembly that may include a fastener (e.g., a bolt and nut) may pass through the bushing 150 to attach the bushing 150 to the clevis 114. In this regard, for example, the fastener assembly may pass through the clevis 114 and be affixed thereto. On the side of the rod 140 with the second ring 144, a different fastener assembly may be used to attach the second ring 144, with the bushing 150 therein, to the knuckle 130. However, the suspension link 120 may further incorporate a coupling assembly as further described hereinafter. Before describing the coupling assembly, however, it may be beneficial to appreciate the structural context in which the coupling assembly is employed in more detail. FIG. 2 provides some such context.

In this regard, FIG. 2 illustrates a perspective view of one instance of the bushing 150 in accordance with an example embodiment. The bushing 150 may be the same used within the first ring 142 and the second ring 144. However, in some cases, the bushing 150 that is employed with the second ring 144 may be different, or modified, by including the coupling assembly described below. The bushing 150 may include an inner metal portion 200, which may be surrounded on lateral sides by a rubber portion 210, which may in turn be surrounded on lateral sides by an outer metal portion 220. The rubber portion 210 may, in some cases, substantially cover all lateral sides of the inner metal portion 200, but further have a lateral portion (P) that may be longer than the outer metal portion 220 in an axial direction, but coats thinly over the inner metal portion 200 underneath it.

The formation and internal coupling of these portions of the bushing 150 is outside the scope of this disclosure, and may be largely conventional. The important part, for purposes of this disclosure, is that a coupling assembly may be used to operably couple the bushing 150 to the knuckle 130 of FIG. 1 (e.g., via the cantilever joint), and that the ordering and/or orienting of the components of the cantilever joint may be dictated by the structure of the coupling assembly.

To ensure that the coupling assembly for fastening the bushing to the knuckle 130 via the cantilever joint is performed consistently correctly in terms of its orientation and part ordering, it may be desirable to define a poka-yoke mechanism or one-way assembly structure that can only be installed in the correct way due to physical or structural limitations or guides that necessarily cause that result. Provision of the poka-yoke mechanism may, in some cases, be provided as a one-way feature (or one-way installation feature) that is shown in FIG. 3.

Figure 3:
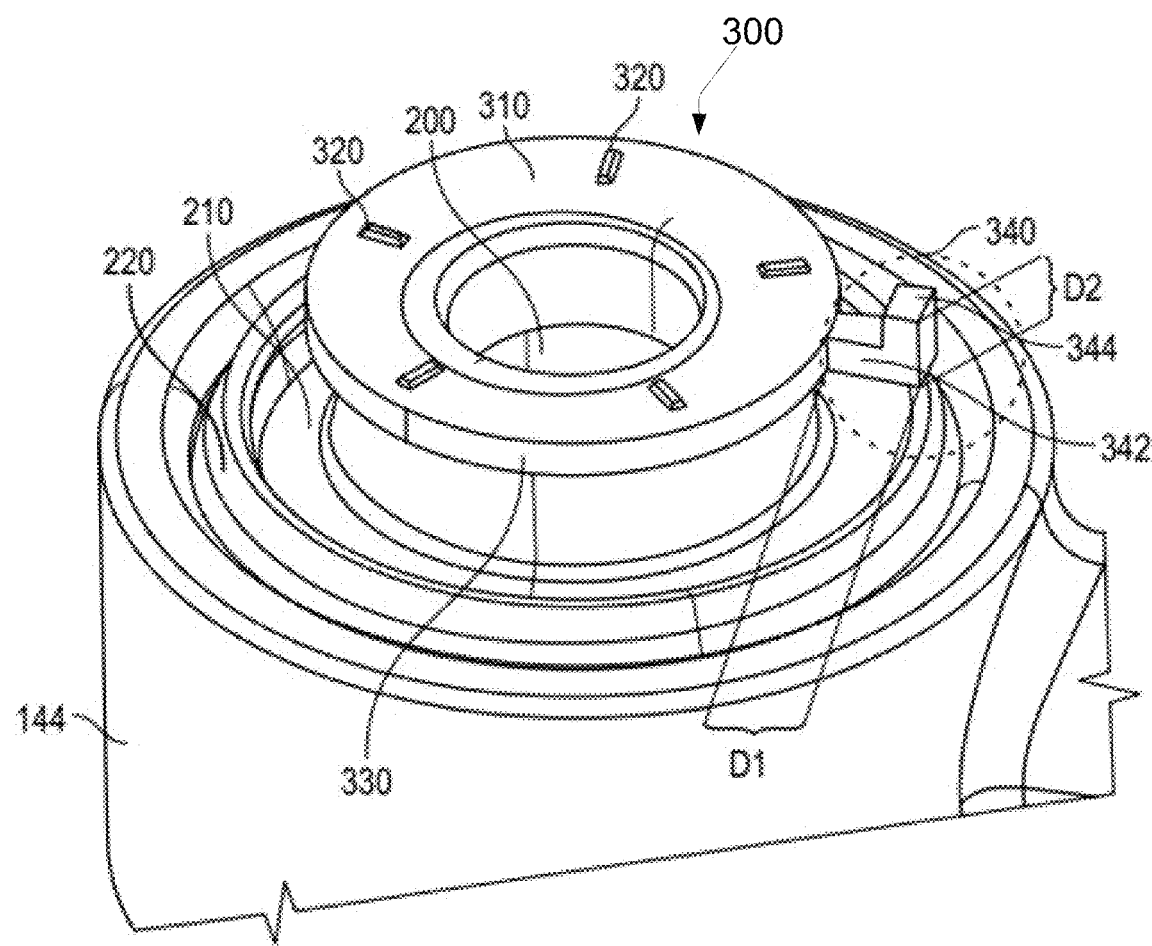
FIG. 3 illustrates a perspective view of a portion of a coupling assembly with a one-way install features of an example embodiment.

Before turning to FIG. 3, it may be appreciated that the bushing 150 of FIG. 2 may typically have a washer provided on each opposing side thereof, and the washer may press into the inner metal portion 200 and/or the rubber portion 210 of the bushing 150. In some cases, another (larger) washer may be provided between one of those washers that sit proximate to the bushing 150 and this other (larger) washer may have a diameter that is larger than a diameter of the link eye (or hole) of the ring (e.g., the first or second ring 142 or 144). The other (larger) washer may be proximate a head of the bolt or fastener that is passed through the inner metal portion 200 to engage the knuckle 130.

In order to keep the cantilever joint tight, it may be desirable to employ a serrated washer between the bushing 150 and the knuckle 130. The serrations may be able to embed into the knuckle 130 to make the joint tight. However, if the washers were switched, the serrations may be oriented to face the other (larger) washer, and may not be able to embed into the other (larger) washer due to the excessive hardness of the other (larger) washer. Thus, the provision of the serrations on that washer may not provide the intended purpose since there is insufficient contact area between the washer and the bushing, which may allow the joint to loosen over time.

Turning to FIG. 3, the bushing 150 may be provided with a coupling assembly 300 that may only be installed only one way relative to the second ring 144 and the knuckle 130. In this regard, the coupling assembly 300 may be defined by a serrated face 310 defining a washer-like component that has serrations 320 dispersed over the serrated face 310. In this example, there are five serrations 320 provided, and they are spaced apart at regular intervals and extend radially outward from a central axis of the bushing 150 (substantially aligning a passage through the serrated face 310 with a channel that passes through the inner metal portion 200 along its axis). However, different numbers of serrations and different positioning or orientations may be employed in other example embodiments.

The serrated face 310 may, in some cases, be disposed at a washer-like metallic plate that is formed as a bushing ferrule 330 operably coupled to, or otherwise extended from, the inner metal portion 200 of the bushing 150. Thus, for example, the serrated face 310 (and bushing ferrule 330 on which it is located) may be integrally formed with the inner metal portion 200. However, it may be possible for the serrated face 310 to be provided on a separate washer component in some embodiments.

The coupling assembly 300 may also include a one-way install feature in the form of flange 340 (the circled element in FIG. 3). Flange 340 may be formed as an extension or addition to the bushing ferrule 330. Thus, for example, the flange 340 may be an integral part of the bushing ferrule 330. The flange 340 may include a first arm 342 disposed to extend radially outwardly from a circumference or outer edge of the serrated face 310 at least a first distance (D1). The flange 340 may include a second arm 344 extending substantially perpendicular to the first arm 342 at a distal end of the first arm 342 by a second distance (D2). The second distance (D2) may be longer than the exposed portion (P) of the rubber portion 210. In an example embodiment, the second arm 344 may extend alongside a portion of the knuckle 130 when bushing is installed with the serrated face 310 oriented toward the knuckle 130. This portion of the knuckle 130 may be referred to as a shoulder portion 350 of the knuckle 130, and the arrangement of the second arm 344 proximate to or extending along the shoulder portion 350 is shown in FIG. 4.

Figure 4:
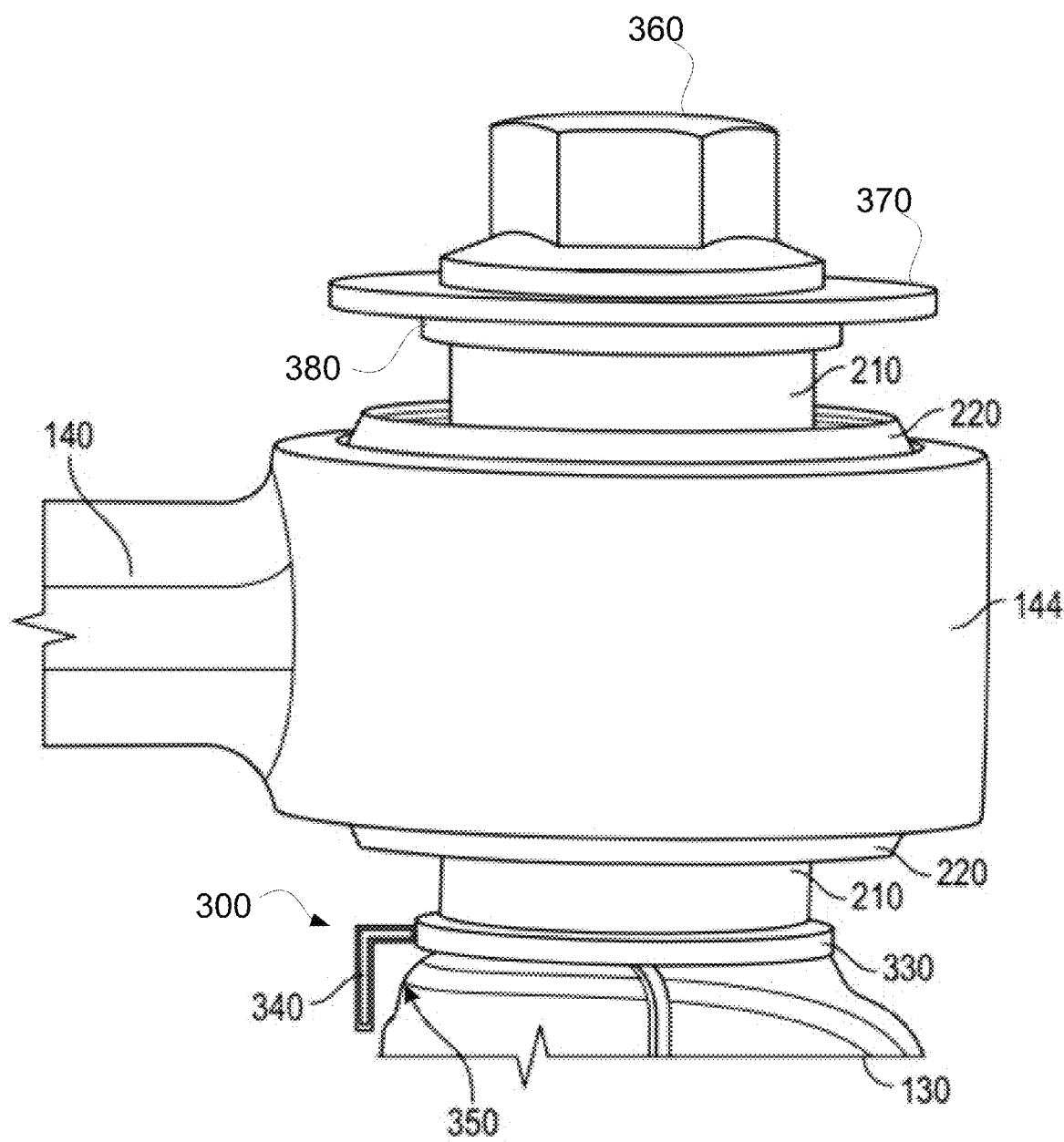
FIG. 4 illustrates a fastener connecting the bushing and coupling assembly to a knuckle with proper orientation in accordance with an example embodiment.

Referring to FIG. 4, the suspension link 120 may be operably coupled to the knuckle 130 via a fastener 360. The fastener 360 may pass through the channel that extends along an axis of the inner metal portion 200 to engage the knuckle 130 (e.g., via threaded engagement), and may be tightened to a desired torque level. In an example embodiment, the fastener 360 may be disposed proximate to a first washer 370, which is in turn disposed proximate to a second washer 380. The first washer 370 may have a diameter that is larger than a diameter of the second washer 380 (and also larger than a diameter of the bushing ferrule 330, which may have a similar diameter to that of the second washer 380). In particular, the first washer 370 may have a diameter that is larger than the link eye of the second link 144, to prevent any possibility of the head of the fastener 360 and the first washer 370 from passing through the link eye. The second washer 380 may contact the inner metal portion 200 of the bushing 150 and be disposed directly between the inner metal portion 200 and the first washer 370.

Figure 5:
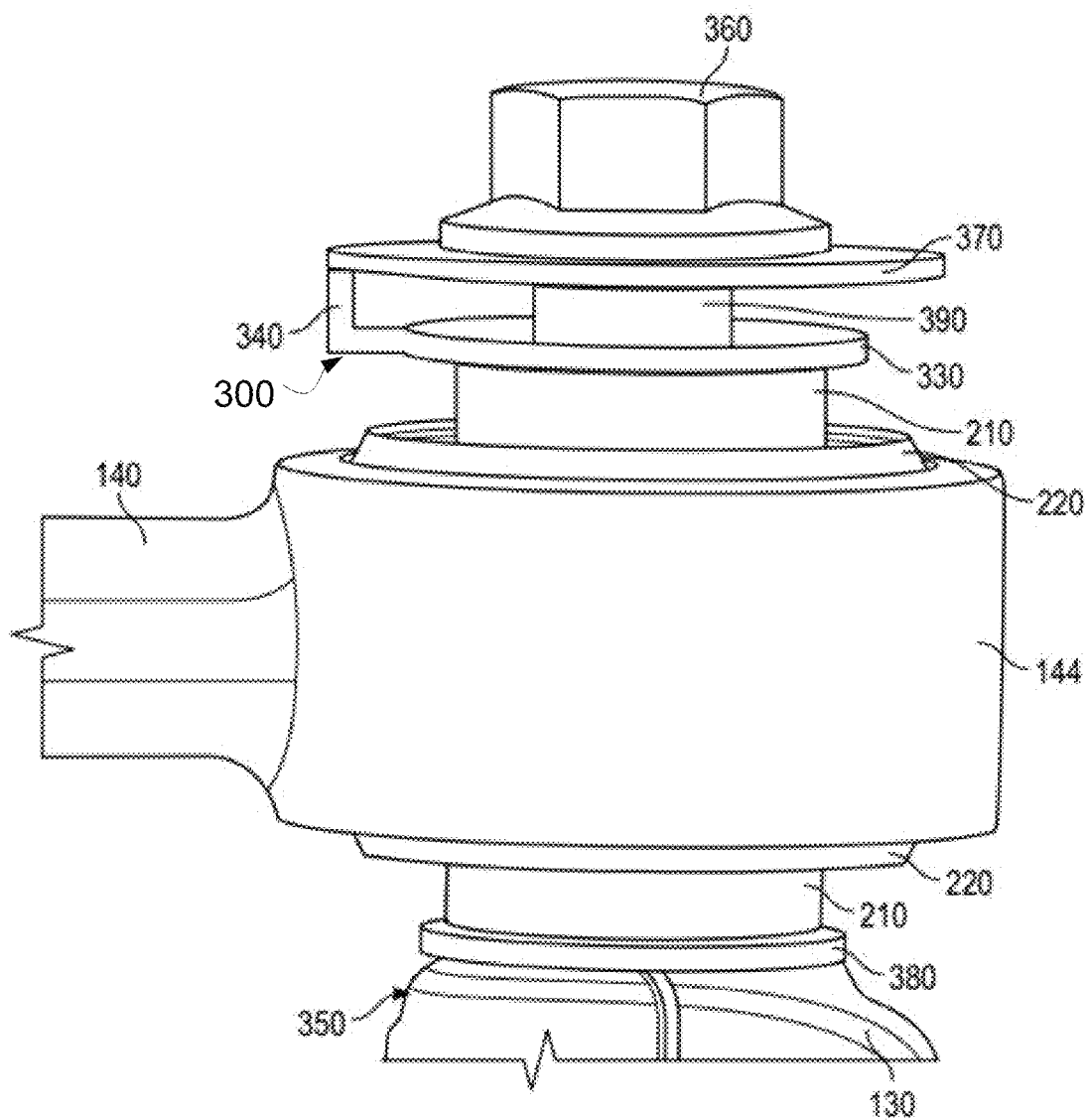
FIG. 5 illustrates a planned misalignment that occurs when the bushing is installed backwards for the coupling assembly in accordance with an example embodiment.

Tightness of this joint is desirable, as noted above. Therefore, the serrated face 310 may engage the knuckle 130 to prevent slippage of the joint. To ensure that the orientation of all components is not only proper, but cannot be improper, the flange 340 may only fit when installed proximate to the shoulder portion 350 as shown in FIG. 4. If an attempt is made to install the suspension link 120 backwards (or install the bushing 150 backwards when forming the coupling of the suspension link 120 to the knuckle 130), the first washer 370 will not be able to contact the second washer 380 as shown in FIG. 5. In this regard, the first distance (D1), when added to the radius defining the circumferential edge of the serrated face 310, is of a length that it clears the shoulder portion 350, but does not extend beyond the edge of the first washer 370. The second distance (D2) is also selected to allow fit proximate to the shoulder portion 350, but prevent a close fit between the ferrule 330 and flange 340 and the first washer 370. Indeed, an attempt to incorrectly install the bushing 150 will leave a portion of a shaft 390 of the fastener 360 exposed, as shown in FIG. 5, and will be unmistakable to the assembler. The assembler would then know to flip the bushing 150, and the serrated face 310 would invariably be installed (properly) proximate to the knuckle 130 resulting in the desired tight joint for the cantilevered joint with the knuckle 130.

Notably, if the bushing 150 happened to be attempted for insertion into the first ring 142 instead of the second ring 144, the flange 340 would also prevent insertion into the clevis 114. In this regard, the flange 340 makes the bushing 150 wider than the clevis 114 to prevent improper assembly in this way as well.

A vehicle suspension link for upgraded vehicle suspension may therefore be provided. The vehicle suspension link may include a bushing, a knuckle, a link arm operably coupled to the knuckle via the bushing at a ring formed at one end of the link arm, and a coupling assembly disposed between the knuckle and the bushing. The coupling assembly may include a serrated face and a one-way install feature extending out of a plane of the serrated face to permit orientation of the bushing in the ring such that the serrated face is oriented toward the knuckle, and prevent orientation of the serrated face away from the knuckle.

The suspension link (or a suspension system including such link) of some embodiments may include additional features, modifications, augmentations and/or the like to achieve further objectives or enhance performance of the assembly. The additional features, modifications, augmentations and/or the like may be added in any combination with each other. Below is a list of various additional features, modifications, and augmentations that can each be added individually or in any combination with each other. For example, the suspension link may further include a fastener disposed to extend from a head portion on a side of the link arm opposite the knuckle into the knuckle. A first washer may be disposed proximate to the head portion of the fastener, and a second washer disposed between the first washer and the bushing. In an example embodiment, the ring may define a link eye into which the bushing is provided and through which the fastener passes to engage the knuckle, and a diameter of the first washer may be larger than a diameter of the link eye. In some cases, the second washer may have a diameter substantially equal to a diameter of the serrated face and less than a diameter of the first washer. In an example embodiment, the one-way install feature may include a flange disposed to extend over a shoulder of the knuckle, but encounter the first washer if installed any way other than between the bushing and the knuckle with the flange extending over the shoulder of the knuckle. In some cases, the flange may extend away from an axis of the first washer by a distance less than the diameter of the link eye. In an example embodiment, the flange may be integrally formed as a ferrule at one axial end of the bushing. In some cases, the bushing may include an inner metal portion, a rubber portion disposed around lateral sides of the inner metal portion, and an outer metal portion disposed around lateral sides of the rubber portion. Within this context, an exposed portion of the rubber portion may be longer than the outer metal portion in an axial direction. The one-way install feature may include a flange integrally formed with a ferrule of the inner metal portion on which the serrated face is formed at one axial end of the bushing. The flange may include a first arm disposed to extend radially outwardly from a circumference of the serrated face at least a first distance, and a second arm extending substantially perpendicular to the first arm at a distal end thereof by a second distance, where the second distance is longer than the exposed portion of the rubber portion. In an example embodiment, the second arm may extend alongside a portion of the knuckle when bushing is installed with the serrated face oriented toward the knuckle. In some cases, the serrated face engages the knuckle to prevent slippage of the joint.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A vehicle suspension link comprising:
a bushing;
a knuckle;
a link arm operably coupled to the knuckle via the bushing at a ring formed at one end of the link arm; and
a coupling assembly disposed between the knuckle and the bushing,
wherein the coupling assembly comprises a serrated face and a one-way install feature extending out of a plane of the serrated face to permit orientation of the bushing in the ring such that the serrated face is oriented toward the knuckle, and prevent orientation of the serrated face away from the knuckle.

2. The vehicle suspension link of claim 1, further comprising a fastener disposed to extend from a head portion on a side of the link arm opposite the knuckle into the knuckle, and
    wherein a first washer is disposed proximate to the head portion of the fastener, and a second washer disposed between the first washer and the bushing.

3. The vehicle suspension link of claim 2, wherein the ring defines a link eye into which the bushing is provided and through which the fastener passes to engage the knuckle, and
    wherein a diameter of the first washer is larger than a diameter of the link eye.

4. The vehicle suspension link of claim 3, wherein the second washer has a diameter substantially equal to a diameter of the serrated face and less than a diameter of the first washer.

5. The vehicle suspension link of claim 3, wherein the one-way install feature comprises a flange disposed to extend over a shoulder of the knuckle, but encounter the first washer if installed any way other than between the bushing and the knuckle with the flange extending over the shoulder of the knuckle.

6. The vehicle suspension link of claim 5, wherein the flange extends away from an axis of the first washer by a distance less than the diameter of the link eye.

7. The vehicle suspension link of claim 5, wherein the flange is integrally formed as a ferrule at one axial end of the bushing.

8. The vehicle suspension link of claim 1, wherein the bushing comprises an inner metal portion, a rubber portion disposed around lateral sides of the inner metal portion, and an outer metal portion disposed around lateral sides of the rubber portion,
    wherein an exposed portion of the rubber portion is longer than the outer metal portion in an axial direction,
    wherein the one-way install feature comprises a flange integrally formed with a ferrule of the inner metal portion on which the serrated face is formed at one axial end of the bushing, the flange comprising a first arm disposed to extend radially outwardly from a circumference of the serrated face at least a first distance, and a second arm extending substantially perpendicular to the first arm at a distal end thereof by a second distance, the second distance being longer than the exposed portion of the rubber portion.

9. The vehicle suspension link of claim 8, wherein the second arm extends alongside a portion of the knuckle when bushing is installed with the serrated face oriented toward the knuckle.

10. The vehicle suspension link of claim 9, wherein the serrated face engages the knuckle.

11. A vehicle suspension system comprising:
a frame comprising one or more lateral or longitudinal frame members;
a knuckle operably coupled to the frame; and
a vehicle suspension link operably coupling the knuckle to the frame, wherein the vehicle suspension link comprises:
a bushing;
a link arm operably coupled to the knuckle via the bushing at a ring formed at one end of the link arm; and
a coupling assembly disposed between the knuckle and the bushing,
    wherein the coupling assembly comprises a serrated face and a one-way install feature extending out of a plane of the serrated face to permit orientation of the bushing in the ring such that the serrated face is oriented toward the knuckle, and prevent orientation of the serrated face away from the knuckle.

12. The vehicle suspension system of claim 11, wherein the vehicle suspension link further comprises a fastener disposed to extend from a head portion on a side of the link arm opposite the knuckle into the knuckle, and
    wherein a first washer is disposed proximate to the head portion of the fastener, and a second washer disposed between the first washer and the bushing.

13. The vehicle suspension system of claim 12, wherein the ring defines a link eye into which the bushing is provided and through which the fastener passes to engage the knuckle, and
    wherein a diameter of the first washer is larger than a diameter of the link eye.

14. The vehicle suspension system of claim 13, wherein the second washer has a diameter substantially equal to a diameter of the serrated face and less than a diameter of the first washer.

15. The vehicle suspension system of claim 13, wherein the one-way install feature comprises a flange disposed to extend over a shoulder of the knuckle, but encounter the first washer if installed any way other than between the bushing and the knuckle with the flange extending over the shoulder of the knuckle.

16. The vehicle suspension system of claim 15, wherein the flange extends away from an axis of the first washer by a distance less than the diameter of the link eye.

17. The vehicle suspension system of claim 15, wherein the flange is integrally formed as a ferrule at one end of the bushing.

18. The vehicle suspension system of claim 11, wherein the bushing comprises an inner metal portion, a rubber portion disposed around lateral sides of the inner metal portion, and an outer metal portion disposed around lateral sides of the rubber portion,
    wherein an exposed portion of the rubber portion is longer than the outer metal portion in an axial direction,
    wherein the one-way install feature comprises a flange integrally formed with a ferrule of the inner metal portion on which the serrated face is formed at one axial end of the bushing, the flange comprising a first arm disposed to extend radially outwardly from a circumference of the serrated face at least a first distance, and a second arm extending substantially perpendicular to the first arm at a distal end thereof by a second distance, the second distance being longer than the exposed portion of the rubber portion.

19. The vehicle suspension system of claim 18, wherein the second arm extends alongside a portion of the knuckle when bushing is installed with the serrated face oriented toward the knuckle.

20. The vehicle suspension system of claim 19, wherein the serrated face engages the knuckle.

\* \* \* \* \*